United States Patent [19]

Homanick et al.

[11] Patent Number: 5,645,382
[45] Date of Patent: Jul. 8, 1997

[54] CONTROLLED ATMOSPHERE MACHINING

[75] Inventors: George Homanick, Northville; Edward J. Early, Oakland, both of Mich.

[73] Assignee: Cargill Detroit Corporation, Clawson, Mich.

[21] Appl. No.: 527,491

[22] Filed: Sep. 13, 1995

[51] Int. Cl.⁶ .............................. B23Q 11/00; B23C 9/00
[52] U.S. Cl. .................... 409/131; 82/1.11; 82/901; 408/1 R; 408/56; 408/67; 409/135; 409/137
[58] Field of Search .................... 82/1.11, 901; 83/98, 83/169; 407/11; 408/1 R, 56, 61, 67; 409/131, 134, 135, 136, 137; 451/89, 451

[56] References Cited

U.S. PATENT DOCUMENTS

| | | |
|---|---|---|
| 3,905,273 | 9/1975 | Shook . |
| 4,038,786 | 8/1977 | Fong . |
| 4,563,924 | 1/1986 | Runkle et al. .............. 408/56 |
| 4,643,056 | 2/1987 | Arehart et al. .............. 408/56 |
| 4,646,484 | 3/1987 | Brull . |
| 4,858,264 | 8/1989 | Reinhart . |
| 5,006,021 | 4/1991 | Wheetley .............. 408/1 R |
| 5,025,597 | 6/1991 | Tada et al. . |
| 5,177,911 | 1/1993 | Ruemelin et al. . |
| 5,380,446 | 1/1995 | Bratten .............. 409/137 |
| 5,509,335 | 4/1996 | Emerson .............. 82/1.11 |

FOREIGN PATENT DOCUMENTS

| | | | |
|---|---|---|---|
| 102844 | 5/1988 | Japan .............. | 83/169 |
| 153202 | 6/1989 | Japan .............. | 82/901 |

Primary Examiner—Daniel W. Howell
Attorney, Agent, or Firm—Dinnin & Dunn, P.C.

[57] ABSTRACT

A controlled atmosphere machining process which involves a work station for machining a workpiece with an inert gas in an enclosed environment which will not support combustion. The process further includes a vacuum system which removes particulate matter occurring during the machining process and transports the matter to a collecting tank. The inert fluid is recycled through a filter and cooling system and continues to be drawn by the vacuum system into the enclosed machining area of each work station.

8 Claims, 2 Drawing Sheets

CONTROLLED ATMOSPHERE MACHINING

BACKGROUND OF THE INVENTION

1. Field of the Invention

This invention relates to machining a workpiece in an inert atmosphere. More specifically, the present invention relates to a process for machining a volatile metal workpiece in an inert atmosphere to reduce the occurrence of combustion of the resultant chips or fines and to reduce the waste material created by prior art volatile metal machining operations. In addition, the process may also include a vacuum system to remove the particulate matter; i.e., chips and fines resulting from the machining operation from the machining area.

2. Description of the Related Art

It is known in the art to machine volatile metals such as magnesium. However, the process is usually a "wet" process in which a coolant, typically a water soluble coolant, is used to cool the workpiece, lubricate the cutting equipment or tool, and flush the particulate matter; i.e., chips and fines from the machining area.

When machining a volatile metal such as magnesium, use of water-based coolant results in several problems: first, the magnesium reacts with the water to form hydrogen gas that besides being a fire hazard presents a serious particulate matter disposal and storage problem since the reaction continues; second, magnesium fines are flammable, presenting an additional hazard in that they may catch fire. A magnesium fire is extremely difficult to extinguish. One solution to insure that the particulates remain cool and stay below their ignition point is to use an oil-based coolant. Use of an oil-based coolant presents a fire hazard and creates a disposal problem as the particulate matter mixes with the coolant making it extremely difficult for recycling of both the coolant and the magnesium cuttings. Finally, any particulate matter produced during the machining operation may mix with the mist produced by the coolant and be carried into the atmosphere presenting a health hazard. While prior art exists for machining magnesium or other volatile metals, typically such a process is a slow machining process; i.e., it reduces the cutting speed to insure that the particulate matter remains cool, as opposed to high-speed machining which result in a "hot chip" which is subject to combustion. Further, while machining in an inert environment has been done on some exotic materials such as lithium on a limited production basis, such processes used low speed machining in laboratory environments and are not suitable for production machining operations.

SUMMARY OF THE INVENTION

Accordingly, the present invention is a unique method for high-speed machining of a volatile metal in a "dry", inert environment in which the particulate matter; i.e., chips and fines are captured and removed from the machining area to reduce any opportunities for combustion and subsequent fire.

In the preferred embodiment, the invention is a method for carrying out a machining operation on a workpiece positioned at a machine station. The machine station supports the workpiece. The machining operation includes energizing a tool to perform work, typically milling, drilling, or cutting the workpiece. An enclosure encloses either the entire workpiece or simply that portion of the workpiece on which the operation is performed. An evacuation system evacuates the ambient air and replaces it with an inert fluid. Once the ambient air is removed and replaced with an inert fluid, the machining process or operation is carried out. The finished part is then removed or transferred from the enclosure.

In a further embodiment, a vacuum system is added to remove any particulate matter from the enclosure during the machining operation. The vacuum system transports the removed matter to a collecting tank that includes a filter system for use in recirculating the inert fluid.

One advantage of such a process is that high speed machining may be used on a volatile metal workpiece such as magnesium in a safe environment. Additionally, hazardous waste is eliminated. The particulate matter may be recaptured and recycled, resulting in savings rather than the cost of disposal for the waste coolant and particulate matter that typically cannot be reclaimed without specialized processing.

DESCRIPTION OF THE PREFERRED EMBODIMENT

Figure 1:
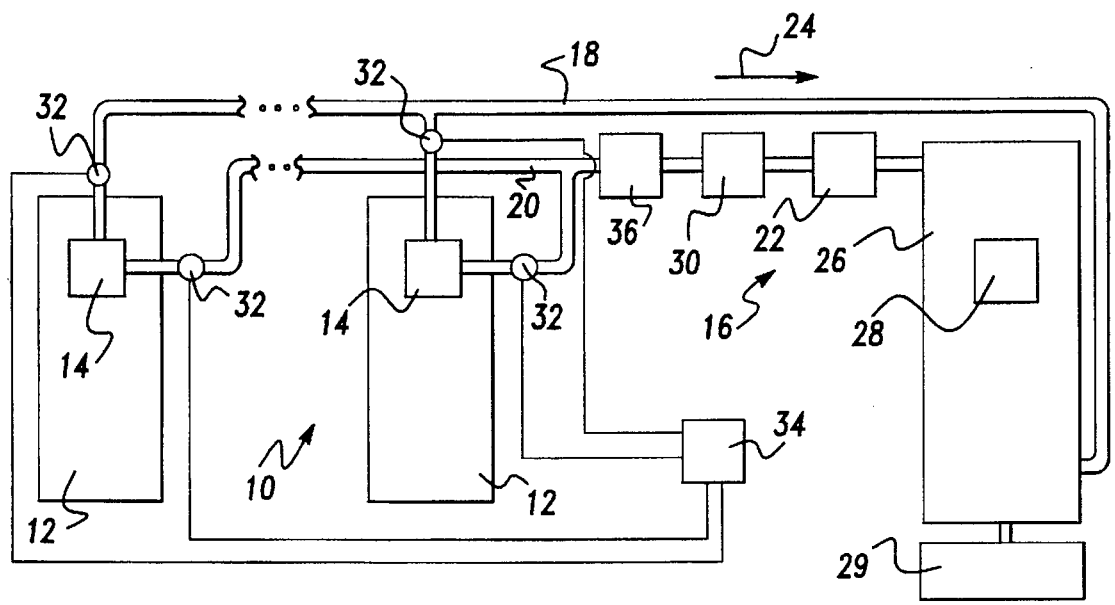
FIG. 1 is a schematic plan view of an apparatus for machining a workpiece in a controlled atmosphere according to the present invention.

Referring to FIG. 1, a controlled atmospheric machining system 10 is shown for use in performing a machining operation on a workpiece. Industry's demand for lighter and stronger components has resulted in the manufacture of many parts from composite metal alloys. Metal parts manufactured from magnesium are lightweight and strong. However, machining magnesium presents several unique problems, specifically reaction with the coolant of particulate matter, i.e., chips and fines resulting from the machining operation, combustability of the particulate matter, and disposal of waste coolant. While previous methods have been used for machining magnesium, they have serious drawbacks. If coolant is used, a chemical reaction takes place. If magnesium is machined dry, a fire hazard exists. The process set forth herein provides a method for performing a machining operation on a volatile metal workpiece in production capacities in a controlled environment.

The method includes a machining station 12 at which an operation is performed on a workpiece. The overall method may include more than one machining station 12 at which different machining operations are conducted including milling, drilling, tapping, grinding or other metal working processes. The workpiece is held in position at the work station 12. An enclosure 14 is placed either adjacent to the workpiece in the area in which the operation is to be performed on the workpiece or the enclosure 14 may cover the entire workpiece or a part of the machine as well. After enclosing the workpiece, the ambient air is evacuated from the enclosure 14 and is replaced with an inert fluid such as nitrogen gas. Nitrogen gas is used in the preferred embodiment because it will not support combustion of the particulate matter, it is relatively inexpensive and does not pose a hazard should it leak into the atmosphere. Other suitable inert fluids may also be used. After evacuation and subsequent replacement with the inert fluid, the machining operation takes place. As set forth above, the use of an inert fluid reduces the opportunity for combustion of the particulate matter resulting from the machining operation. Once the operation is completed, the enclosure 14 is opened. The workpiece is removed or transferred to another work station or the enclosure is removed from adjacent the workpiece.

In addition, a vacuum system seen generally at 16 may be used with the above method. Suitable lines 18, 20 connect the vacuum system 16 to the enclosure 14 and operate to remove the particulate matter created during the performance of the machining operation. The vacuum system 16 aim provides a means for evacuating the enclosure and replacing the evacuated ambient air with an inert fluid. In the preferred embodiment, supply 20 and vacuum 18 lines are attached to the enclosure 14. As illustrated in FIG. 1, a pump 22 draws a vacuum in the direction shown by the arrow 24. The vacuum draws the particulate matter from the enclosure 14 in the direction of the arrow 24 and transports it to a collection tank 26. Included in the collection tank is a filter system 28 for removing chips and fines from the inert fluid. The inert fluid is captured and recirculated through the pump 22 and a cooling station 30 while the particulate matter is collected in a container 29 for recycling and reuse.

As illustrated in FIG. 1 a plurality of valves 32 are used to isolate the enclosures 14 when inserting or removing a workpiece. It should be understood that the valves may be connected to and controlled by a central electronic control system 34 that also monitors pump pressure, vacuum level and other parameters inherent to the system; i.e., inert fluid level, temperature and pressure as well as workpiece presence. Additionally, the system may include a make-up system 36 for adding additional inert fluid to the system, to replace the fluid lost when the enclosure 14 is opened.

Figure 2:
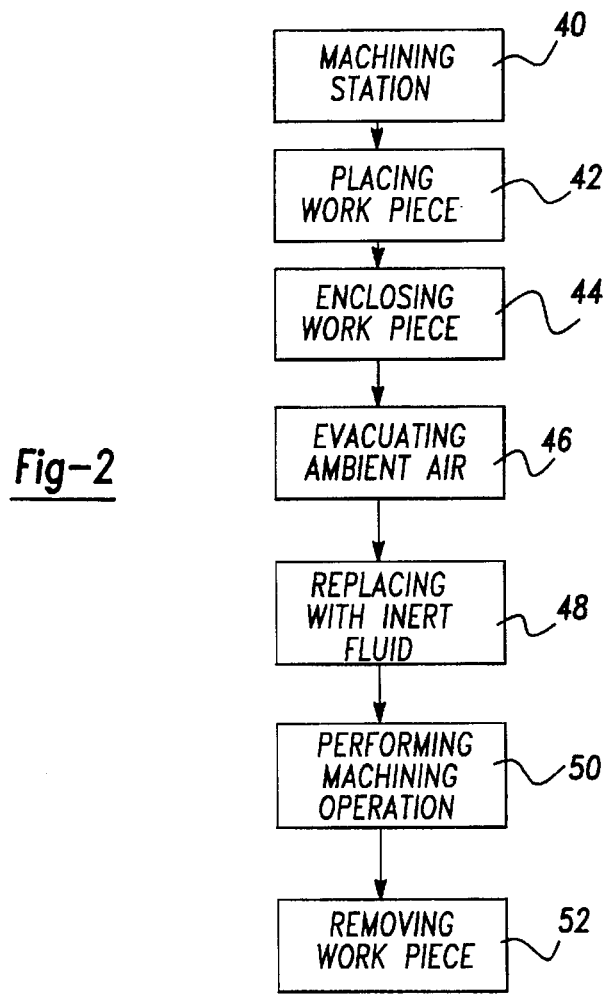
FIG. 2 is a flow chart setting forth the steps of one embodiment of a method of machining a workpiece in a controlled atmosphere according to the present invention.

The flowchart of FIG. 2 illustrates the primary steps of the method of the present invention, the order of which are set forth for illustration only. The method includes the step of providing a machining station 40. Placing a workpiece in the machining station in preparation of performing a machining operation on the workpiece 42. Providing an enclosure defining a chamber and enclosing the workpiece within the chamber before the machining operation 44. Evacuating the ambient air from within the chamber 46. Various means may be used to accomplish the step of evacuating, including a vacuum system that draws out the ambient air. Replacing the ambient air with an inert fluid 48 follows the evacuation step 46. The inert fluid in the preferred embodiment comprises nitrogen gas. Nitrogen gas is used because it is relatively inexpensive, reduces the opportunity for combustion of the particulate matter resulting from the machining operation and is not harmful to the environment when escaping into the atmosphere upon opening the enclosure. After the ambient air has been replaced with an inert fluid, the machining operation is performed on the workpiece 48. Finally, the housing is opened and the workpiece removed from the chamber 50. While the steps of evacuating the ambient air 46 and replacing the ambient air with an inert fluid 48 are shown as two independent as distinct steps, it is contemplated that the steps may be combined into a single operation. For example, in an alternative embodiment the vacuum system 16 operates to draw out the ambient air and at the same time pumping in the inert fluid.

Figure 3:
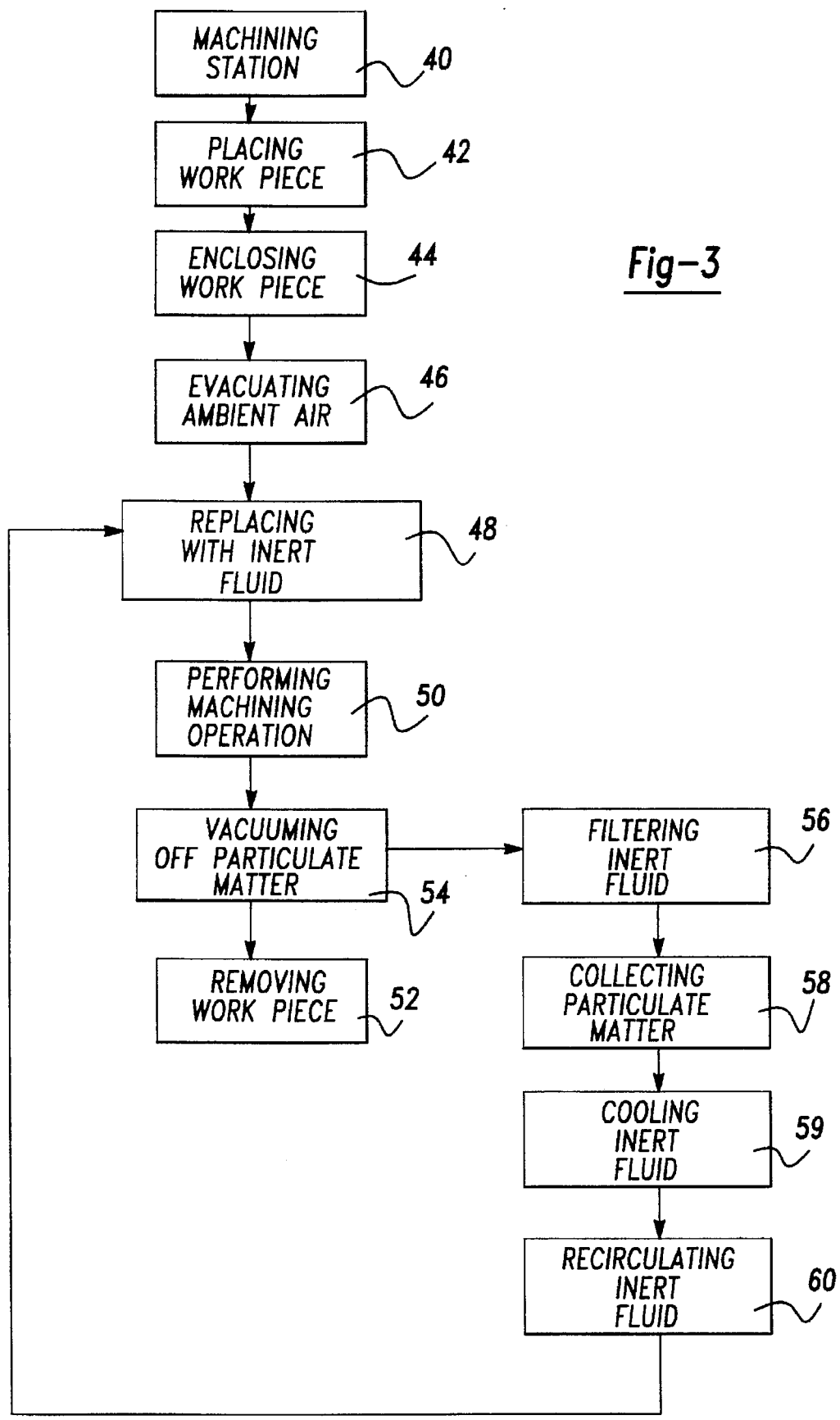
FIG. 3 is a flow chart setting forth the steps of an alternative method of machining a workpiece in a controlled atmosphere according to the present invention.

As discussed, an additional embodiment of the invention includes the step of providing a vacuum system 16. The flow chart of FIG. 3 illustrates the method according to the additional embodiment. The vacuum system 16 provides a means for removing the particulate matter resulting from performance of the machining operation. In the present invention, the vacuum system performs the steps of evacuating the ambient air from within the chamber and replacing it with an inert fluid 46, 48. The method system further includes the steps of filtering the inert fluid to remove the particulate matter from the inert fluid 56, collecting the particulate matter from the filter 58, cooling the inert fluid 59 and recirculating the inert fluid 60, thus providing a closed system.

It should be appreciated that the process and method set forth above provides production capacity machining using an inert fluid in an enclosed environment which will not support combustion. The method further provides for containment and control of the particulate matter resulting from the machining operation by removing the chips, fines and other particulate matter through a vacuuming step as they are generated. The particulate matter is transported to a filtering station that removes and collects the particulate matter from the inert fluid after which the inert fluid is recirculated. The vacuum continuously draws the inert fluid into the chamber of each machining station thus continuously removing the particulate matter while providing an environment that will not support combustion.

Various changes can be made to the embodiments shown herein without departing from the scope of the present invention.

What is claimed is:

1. A method for machining a workpiece in a controlled atmosphere comprising the steps of:

providing a machining station for performing a machining operation on the workpiece;

placing said workpiece on said machining station;

providing an enclosure, said enclosure including a chamber and enclosing said workpiece within said chamber;

replacing ambient air in said chamber with an inert fluid;

performing said machining operation on said workpiece and removing said workpiece from said enclosure after said machining operation has been performed;

said step of replacing said ambient air with an inert fluid are performed through an inlet port and an outlet port on said enclosure wherein a vacuum system draws the ambient air from the chamber through the outlet port and replaces it with an inert fluid through the inlet port;

said step of vacuuming particulate matter resulting from performance of the machining operation wherein said particulate matter is vacuumed from the enclosed chamber, transported to and collected in a collecting tank, the step of vacuuming said particulate matter further includes the step of cooling the inert fluid prior to circulating back to the machine.

2. A method as set forth in claim 1 including the step of filtering the particulates from the inert fluid drawn from the enclosure and recirculating said inert fluid in a closed system.

3. A method as set forth in claim 1 wherein said inert fluid is nitrogen.

4. A method for machining a workpiece in a controlled atmosphere comprising the steps of:

providing a machining station for performing an operation on a workpiece;

placing said workpiece at said machine station;

enclosing at least that portion of said workpiece to be machined within a chamber;

vacuuming ambient air from within said chamber and replacing said ambient air with an inert fluid;

performing said machining operation on said workpiece;

vacuuming said particulate matter resulting from the performance of said machining operation such that said particulate matter is continuously removed from said chamber;

filtering said inert fluid to remove said particulate matter from said inert fluid; and cooling and recirculating said inert fluid within a closed system.

5. A method as set forth in claim 4 wherein said inert fluid is nitrogen.

6. A method as set forth in claim 4 including the step of cooling the inert fluid prior to recirculating.

7. A method as set forth in claim 4 including the step of pumping said inert fluid through a cooling apparatus to reduce the temperature of said inert fluid.

8. A method as set forth in claim 4 including the step of providing a source of inert fluid to replace any inert fluid lost during operation of the system.

* * * * *